(12) United States Patent
Wang et al.

(10) Patent No.: US 7,328,147 B2
(45) Date of Patent: Feb. 5, 2008

(54) AUTOMATIC RESOLUTION OF SEGMENTATION AMBIGUITIES IN GRAMMAR AUTHORING

(75) Inventors: YeYi Wang, Redmond, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1007 days.

(21) Appl. No.: 10/406,524

(22) Filed: Apr. 3, 2003

(65) Prior Publication Data

US 2004/0199374 A1   Oct. 7, 2004

(51) Int. Cl.
  *G06F 17/27* (2006.01)
(52) U.S. Cl. .......................... 704/9; 704/257
(58) Field of Classification Search ............. None
  See application file for complete search history.

(56) References Cited

U.S. PATENT DOCUMENTS

| 6,052,483 | A  | * | 4/2000  | Baird et al. ............. | 382/190 |
| 6,317,708 | B1 |   | 11/2001 | Witbrock et al. ......... | 704/9   |
| 6,629,066 | B1 |   | 9/2003  | Jackson et al. .......... | 704/9   |
| 6,952,666 | B1 | * | 10/2005 | Weise .................... | 704/9   |
| 7,184,950 | B2 | * | 2/2007  | Weise .................... | 704/9   |
| 2002/0040359 | A1 | * | 4/2002 | Green et al. ............. | 707/3   |
| 2003/0055623 | A1 |   | 3/2003  | Epstein et al. .......... | 704/1   |
| 2003/0216905 | A1 |   | 11/2003 | Chelba et al. ........... | 704/9   |

FOREIGN PATENT DOCUMENTS

| WO | WO 01/93246 A  | 6/2001 |
| WO | WO 01/93246 A2 | 6/2001 |
| WO | WO 01/93249 A1 | 6/2001 |

OTHER PUBLICATIONS

China Office Action for Application No. 200410035225.7 dated Jan. 31, 2007.
Wang Y-Y et al., Concept Acquisition in Example-Based Grammar Authoring, 2003 IEEE International Conference on Acoustics, Speech and Signal Processing. Proceedings (ICASSP) Hong Kong, Apr. 10, 2003 pp. I-284 to I-287.
Wang Y-Y et al., Evaluation of Spoken Language Grammar Learning in the ATIS Domain. 2002 IEEE International Conference on Acoustic Speech, and Signal Processing. Proceedings. (ICASSP) Orlando, FL May 13-17, 2002 pp. I-41 to I-44.
Is Word Error Rate a Good Indicator for Spoken Language Understanding Accuracy, by Ye-Yi Wang et al., 2003 IEEE.
A Unified Context-Free Grammar and N-Gram Model for Spoken Language Processing, By Ye-Yi Wang et al., 2000 IEEE.
Stochastic Automata for Language Modeling, by Giuseppe Riccardi et al. 1996 Academic Press Limited.
Ye-Yi Wang et al., "Grammar Learning for Spoken Language Understanding" pp. 292-295, 2002 IEEE.
Scott Miller et al., "Hidden Understanding Models of Natural Language" pp. 25-32, 1994.
Ye-Yi Wang et al., "Combination of Statistical and Rule-Based Approaches for Spoken Language Understanding", pp. 609-612, 2002.
Ye-Yi Wang et al., "Combination of CFG and N-gram Modeling in Semantic Grammar Learning", pp. 2809-2812, 2003.

* cited by examiner

*Primary Examiner*—Abul K. Azad
(74) *Attorney, Agent, or Firm*—Joseph R. Kelly; Westman, Champlin & Kelly, P.A.

(57) ABSTRACT

A rules-based grammar is generated. Segmentation ambiguities are identified in training data. Rewrite rules for the ambiguous segmentations are enumerated and probabilities are generated for each. Ambiguities are resolved based on the probabilities. In one embodiment, this is done by applying the expectation maximization (EM) algorithm.

25 Claims, 8 Drawing Sheets

```
<Command type="ShowFlight">
    <slot type="Flight"/>
</command>
<object type="Flight">
    <slot type="Time" name="Depart"/>
    <slot type="Time" name="Arrival"/>
    <slot type="City" name="Depart"/>
    <slot type="City" name="Arrival"/>
</object>
```

1. <ShowFlight> → <ShowFlightCmd><ShowFlightProperties>
2. <ShowFlightProperties> → <ShowFlightProperty><Opt.><ShowFlightProperties>
3. <ShowFlightProperty> → <ShowFlightPreFlight><Flight><ShowFlightPostFlight>
4. <Flight> → <FlightProperties>
5. <FlightProperties> → <FlightProperty><Opt.><FlightProperties>
6. <FlightProperty> → <FlightPreDepartureCity><City><FlightPostDepartureCity>
7. <FlightProperty> → <FlightPreArrivalCity><City><FlightPostArrivalCity>
8. <FlightProperty> → <FlightPreDepartureTime><Time><FlightPostDepartureTime>
9. <FlightProperty> → <FlightPreArrivalTime><Time><FlightPostArrivalTime>

"Flight from Seattle to Boston"  213

<ShowFlight>  214
    <Flight>
        <City name = "Arrival">
            Boston
        </City>
        <City name = "Departure">
            Seattle
        </City>
    </Flight>
</ShowFlight>

FIG. 2D

| Example | Possible Preterminals | |
|---|---|---|
| From | ShowFlightCmd | FlightPreDepartureCity |
| Flight from | ShowFlightCmd | FlightPreDepartureCity |
| Flight to | ShowFlightCmd | FlightPreArrivalCity |

FIG. 2F

| Possible Re-write Rule | Count | Probability | $\bar{C}$ |
|---|---|---|---|
| SFCmd→ ε (empty set) | 1/2+1/3+1/3=7/6 | 7/18 | 7/10 |
| SFCmd→ from | 1/2=3/6 | 3/18 | 3/10 |
| SFCmd→ flight | 1/3+1/3=4/6 | 4/18 | ⋮ |
| SFCmd→ flight from | 1/3=2/6 | 2/18 | |
| SFCmd→ flight to | 1/3=2/6 | 2/18 | |
| FPDCity→ ε | 1/2+1/3=5/6 | 5/12 | |
| FPDCity→ from | 1/2+1/3=5/6 | 5/12 | |
| FPDCity→ flight from | 1/3=2/6 | 2/12 | |
| FPACity→ ε | 1/3=1/3 | 1/3 | |
| FPACity→ to | 1/3=1/3 | 1/3 | |
| FPACity→ flight to | 1/3=1/3 | 1/3 | |

FIG. 2G

AUTOMATIC RESOLUTION OF SEGMENTATION AMBIGUITIES IN GRAMMAR AUTHORING

BACKGROUND OF THE INVENTION

The present invention relates to grammar authoring. More specifically, the present invention relates to segmentation disambiguation in an automatic grammar authoring system.

In order to facilitate the development of speech enabled applications and services, semantic-based robust understanding systems are currently under development. Such systems are widely used in conversational, research systems. However, they are not particularly practical for use by conventional developers in implementing a conversational system. To a large extent, such implementations have relied on manual development of domain-specific grammars. This task is time consuming, error prone, and requires a significant amount of expertise in the domain.

In order to advance the development of speech enabled applications and services, an example-based grammar authoring tool has been introduced. The tool is known as SGStudio and is further discussed in Y. Wang and A. Acero, *GRAMMAR LEARNING FOR SPOKEN LANGUAGE UNDERSTANDING*, IEEE Workshop on Automatic Speech Recognition and Understanding, Madonna D. Campiglio Italy, 2001; and Y. Wang and A. Acero *EVALUATION OF SPOKEN LANGUAGE GRAMMAR LEARNING IN ATIS DOMAIN*, Proceedings of ICASSP, Orlando, Fla. 2002. This tool greatly eases grammar development by taking advantage of many different sources of prior information. It also allows a regular developer, with little linguistic knowledge, to build a semantic grammar for spoken language understanding. The system facilitates the semi-automatic generation of relatively high quality semantic grammars, with a small amount of data. Further, the tool not only significantly reduces the effort involved in developing a grammar, but also improves the understanding accuracy across different domains.

However, the tool can be improved. It often resorts to the user when ambiguities must be resolved, in order to induce grammar rules. This can be intrusive, and can slow grammar development.

SUMMARY OF THE INVENTION

A rules-based grammar is generated. Segmentation ambiguities are identified in training data. Rewrite rules for the ambiguous segmentations are enumerated and probabilities are generated for each. Ambiguities are resolved based on the probabilities. In one embodiment, this is done by applying the expectation maximization (EM) algorithm.

BRIEF DESCRIPTION OF THE DRAWINGS

FIG. 2B illustrates an example schema.

FIG. 2C illustrates an example set of rules generated for the example schema.

FIG. 2D illustrates an example of an annotated sentence.

FIG. 2F illustrates a table of possible preterminals for words in examples.

FIG. 2G is a table of re-write rules with associated counts and probabilities.

DETAILED DESCRIPTION OF ILLUSTRATIVE EMBODIMENTS

The present invention deals with a grammar-authoring tool. More specifically, the present invention deals with the automatic disambiguation of segmentations during grammar authoring. However, prior to discussing the present invention in greater detail, one exemplary environment in which the present invention can be used will be discussed.

Figure 1:
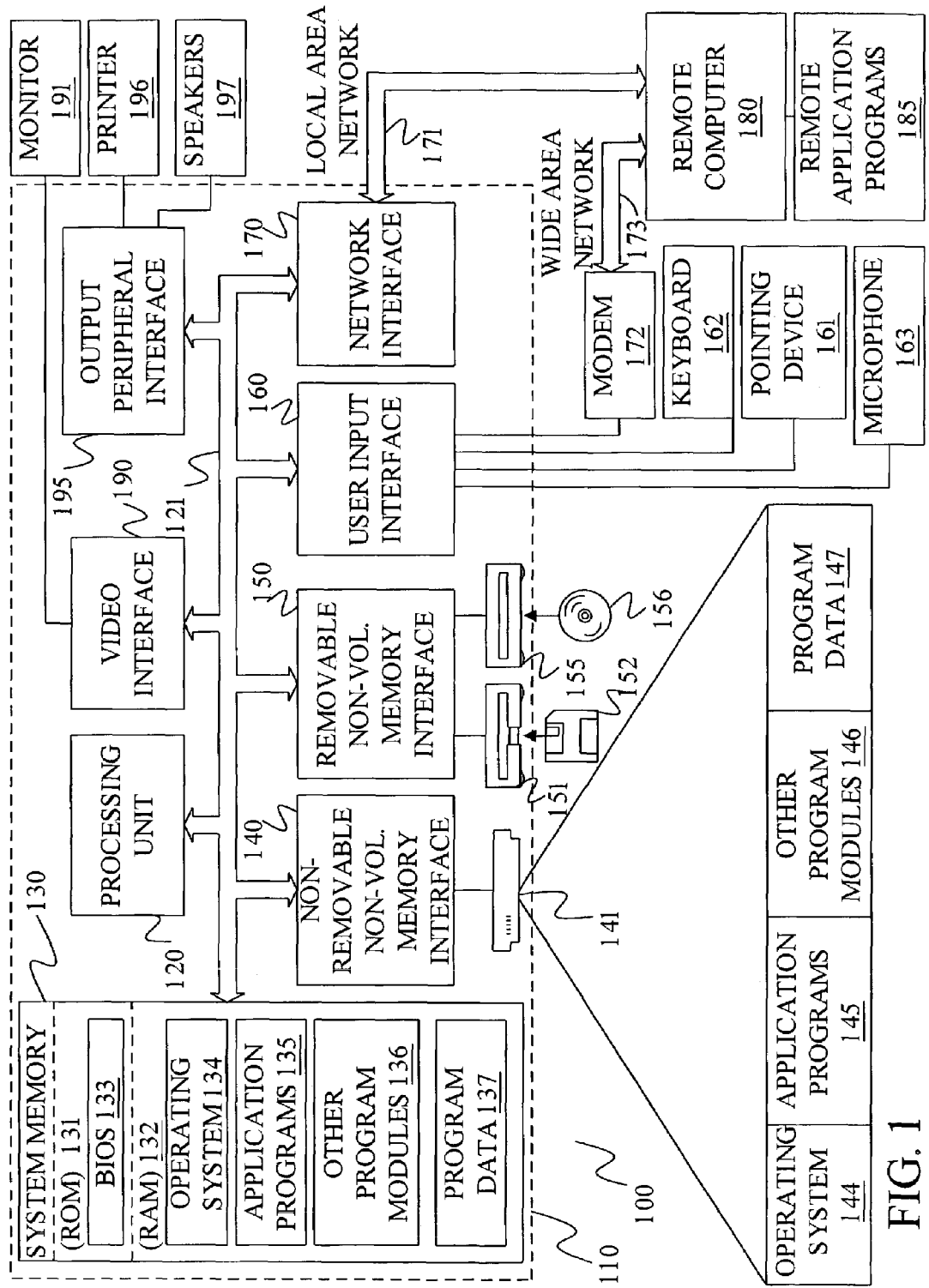
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2A:
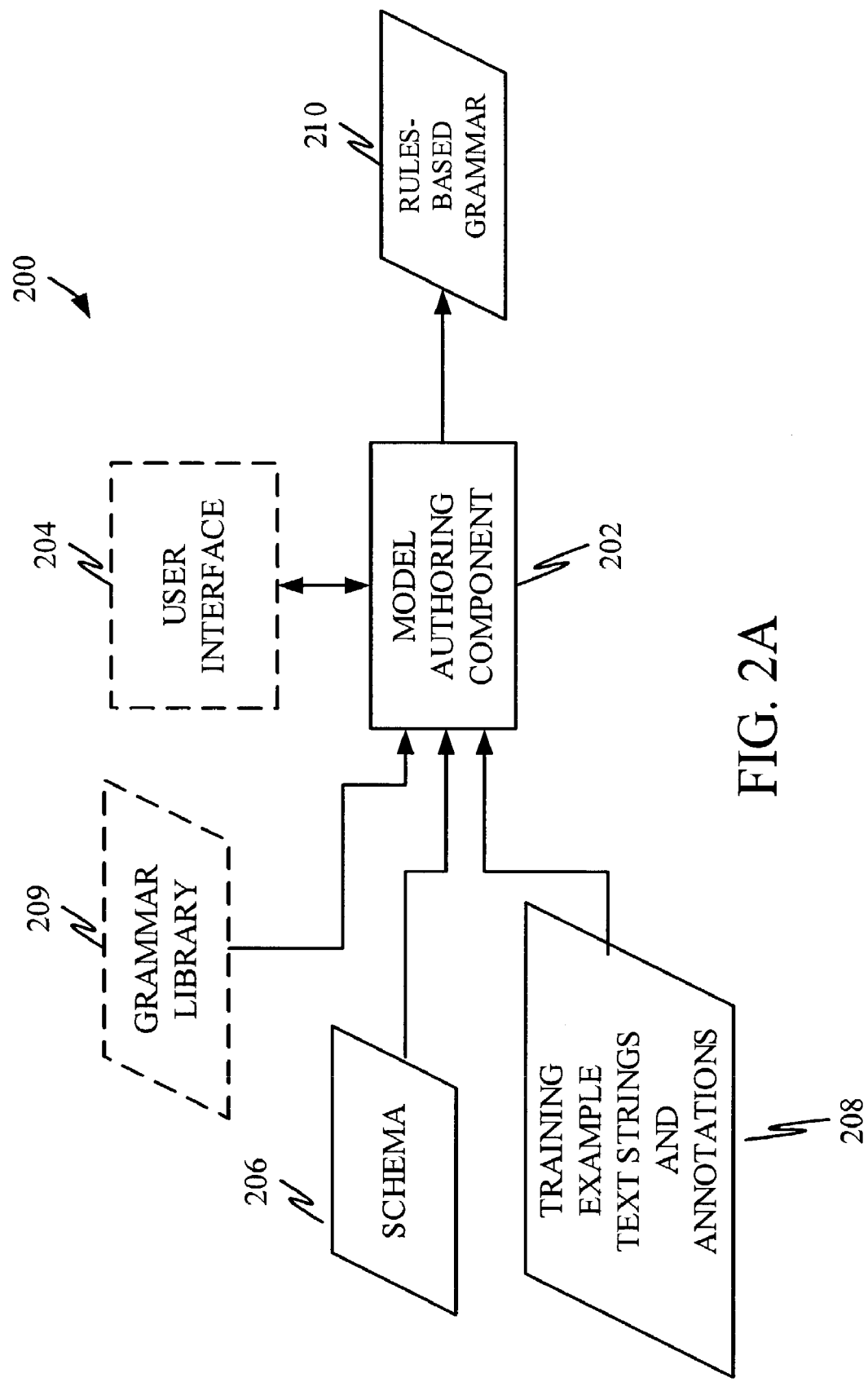
FIG. 2A is a block diagram of one embodiment of a model-authoring component in accordance with one embodiment of the present invention.

FIG. 2A is a block diagram of a model authoring system 200 in accordance with one embodiment of the present invention. Model authoring system 200 includes model authoring component 202 and an optional user interface 204. FIG. 2A also shows that model authoring component 202 receives, as an input, a schema 206, a set of training example text strings and annotations 208, an optional grammar library 209, and outputs a rules-based grammar (such as a context free grammar or CFG) 210. The optional grammar library 209 includes definitions for domain-independent concepts such as date and time as well as domain dependent concepts such as city names, airlines, etc. that can be obtained from an application database.

The detailed operation of system 200 is described at greater length below. Briefly, however, a user provides model authoring component 202 with schema 206 and training example text strings 208. This can be done either through optional user interface 204, or through some other user input mechanism, or through automated means. Model authoring component 202 receives the inputs and generates a rules-based grammar 210 based on the inputs. One example of a rules-based grammar is a context free grammar (or CFG) that allows a computer to map an input to a semantic representation of text.

Schema 206 is illustratively a semantic description of the domain being modeled. One illustration of a schema is shown in FIG. 2B. FIG. 2B illustrates a greatly simplified schema 212 that can be input into system 200, by a developer. Schema 212 is a schema that represents the meaning of various text strings for an input from a user to show flights departing from and arriving to different cities and having different departure and arrival times. Schema 212 indicates that the show flight command (ShowFlight) includes a semantic class for Flight as a slot. Schema 212 also illustrates the semantic class for Flight in greater detail indicating that it has four slots that correspond to a departure time, an arrival time, a departure city and an arrival city.

From schema 212, model authoring component 202 can generate a set of rules illustrated in FIG. 2C. Rule one shows that a ShowFlight sentence will always have a command portion ShowFlightCmd which will be followed by a properties portion ShowFlightProperties.

Rule two indicates that the ShowFlightProperties portion can have one or more properties in it. For example, rule two indicates that the ShowFlightProperties portion includes at least one ShowFlightProperty which can be followed by an optional ShowFlightProperties portion. This recursive definition of ShowFlightProperties simplifies its expression and allows it to have one or more properties.

Rule three shows that the ShowFlightProperty portion includes a ShowFlightPreFlight portion, a Flight portion, and a ShowFlightPostFlight portion. This indicates that the slot Flight in the schema can have both a preamble and a postamble.

The fourth rule indicates that the object Flight in the schema does not have a command portion, but only has a properties portion (FlightProperties), because Flight is an object in the schema while ShowFlight is a command. Rule five shows that the FlightProperties portion is again recursively defined to include at least one FlightProperty followed by an optional FlightProperties.

Rules six-nine correspond to the four slots in schema 212 shown in FIG. 2B. Rule six defines the first property as having a departure city slot that is preceded by a preamble (FlightPreDepartureCity) and is followed by a postamble (FlightPostDepartureCity). Rule seven defines the arrival city in the same way, and rules eight and nine define the departure time and arrival time in a similar fashion, respectively.

Even given the fact that all of the rules identified in FIG. 2C can be automatically generated from schema 212 by model authoring component 202, there are still no rewrite rules that indicate what specific words are actually mapped to the specific pre-terminals (command for a command semantic class, as well as preambles and postambles for slots.) For example, there is no rule which would indicate that the phrase "please show me the flights . . . " is mapped to the ShowFlightCmd. Similarly, there is no rewrite rule which indicates which words would specifically map to, for example, the FlightPreArrivalCity preamble, etc. Therefore, the developer also inputs training example text strings and annotations 208 such that model authoring component 202 can learn these rewrite rules as well.

FIG. 2D illustrates one example of an example text string 213 "Flight from Seattle to Boston" along with a semantic annotation 214 that corresponds to text string 213. Semantic annotation 214 is provided by the developer and indicates the semantic meaning of string 213. Semantic annotation 214, for example, shows that the input text string 213 corresponds to a ShowFlight command that has a slot Flight which itself has two slots, both of which are cities. The distinction between the two slots in the Flight slot is made only by the name of the slot. One is referred to as the "Arrival" city and the other is referred to as the "Departure" city. Semantic annotation 214 also maps the word "Boston" to the "Arrival" city slot and the word "Seattle" to the "Departure" city slot. Therefore, based on the annotation 214, model authoring component 202 will know which slots map to the words "Seattle" and "Boston".

Figure 2E:
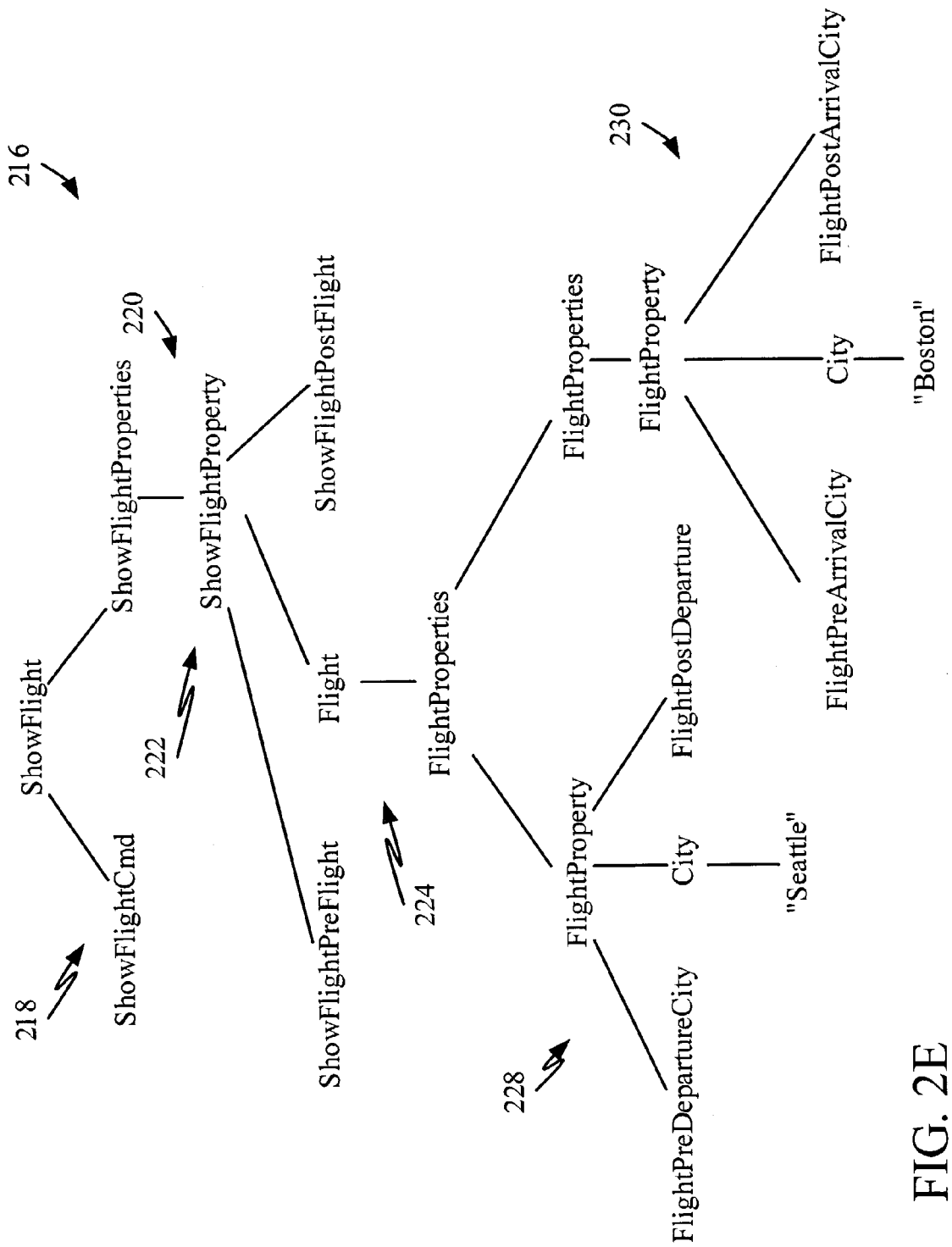
FIG. 2E illustrates an example parse tree.

From the annotated example and the template grammar rules shown in FIG. 2C, model authoring component 202 can generate a rules-based grammar (or CFG) parse tree, such as parse tree 216 illustrated in FIG. 2E. The first level 218 of parse tree 216 (the portion that shows that Show-Flight is formed of ShowFlightCmd followed by Show-FlightProperties) is formed from rule 1 in FIG. 2C.

The second level 220 (the portion indicating that Show-FlightProperties is formed of ShowFlightProperty) is generated from rule 2 where the optional ShowFlightProperties portion is not used.

The next level 222 (the portion indicating that Show-FlightProperty is formed of ShowFlightPreFlight followed by Flight followed by ShowFlightPostFlight) is generated from rule 3 in FIG. 2C.

The next level 224 (indicating that the Flight object is formed of a FlightProperties section) is generated from rule 4 in FIG. 2C.

The next level 226 (the portion indicating that the Flight-Properties portion is formed of a FlightProperty portion followed by a FlightProperties portion) is generated from rule 5 in FIG. 2C.

The next level 228 (the level indicating that the Flight-Property portion is formed of a FlightPreDepartureCity portion followed by a City slot followed by a FlightPost-DepartureCity postamble) is generated from rule 6, and the next level 230 (the level showing that FlightProperties is formed of a FlightPreArrivalCity preamble, a City slot and a FlightPostArrivalCity postamble) is generated from rule 7.

Finally, the level indicating that the word "Seattle" is mapped to the City slot under level 228 and that the word "Boston" is mapped to the City slot under level 230 are generated from the semantic annotation 214 which is also input by the user. Thus, model authoring component 202 can learn how to map from the words "Seattle" and "Boston" in the input sentence into the CFG parse tree and into the rules generated in FIG. 2C. It should be noted that city rules can also be obtained from a library grammar (which in turn can be constructed by taking the data from the domain-specific database) instead of annotated data.

However, there are still a number of words in the input sentence which are not yet mapped to the tree. Those words include "Flight", "from", and "to". Since the words "Flight" and "from" precede the word "Seattle", they can map to a variety of preterminals in parse tree 216, including Flight- Cmd, ShowFlightPreFlight, and FlightPreDepartureCity. Similarly, since the word "to" resides between the words "Seattle" and "Boston" in input text string 213, the word "to" can map to either FlighPostDepatureCity or FlightPreArrivalCity.

Since it is known that the word "to" is a preposition, it must modify what comes after it. Therefore, it can be determined that the word "to" maps to the FlightPreArrivalCity perterminal in parse tree 216.

However, it is still unknown where the words "Flight" and "from" should reside in parse tree 216. Also, the particular segmentation for the two words is unknown. For example, in one alternative, the word "Flight" can be mapped to ShowFlightCmd while the word "from" is mapped to ShowFlightPreFlight. In that case, the preterminal FlightPreDepatureCity is mapped to an empty set.

In accordance with another alternative, both words "Flight" and "from" are mapped to ShowFlightCmd" while the other preterminals ShowFlightPreFlight and FlightPreDepartureCity are both mapped to empty sets.

In still another alternative, "Flight" is mapped to ShowFlightCmd and "from" is mapped to FlightPreDepartureCity, while the remaining preterminal ShowFlightPreFlight is mapped to an empty set.

This represents a segmentation ambiguity which historically has not been resolved in the absence of additional information from the developer. In some prior systems, each of the possible segmentations was simply displayed to the user, and the user was allowed to choose one of those segmentations.

However, this has resulted in a number of problems. First, this type of interaction with the user is intrusive and time consuming. Also, when there are more possible preterminals, and more unaligned words in the input text string, the number of possibilities which must be presented to the user rises dramatically. It is very difficult, if not impossible, to effectively display all such candidate segmentations for selection by the user. In addition, even when the segmentations were adequately displayed for selection by the user, user's often make errors in the segmentation or segment similar text strings inconsistently.

In accordance with one embodiment of the present invention, the expectation maximization (EM) algorithm is applied to segmentation ambiguities in model component 202 in order to disambiguate the segmentation choices. The EM algorithm, in general, is an algorithm for estimating model parameters with maximum likelihood estimator when the model contains unobservable hidden variables.

Figure 3A:
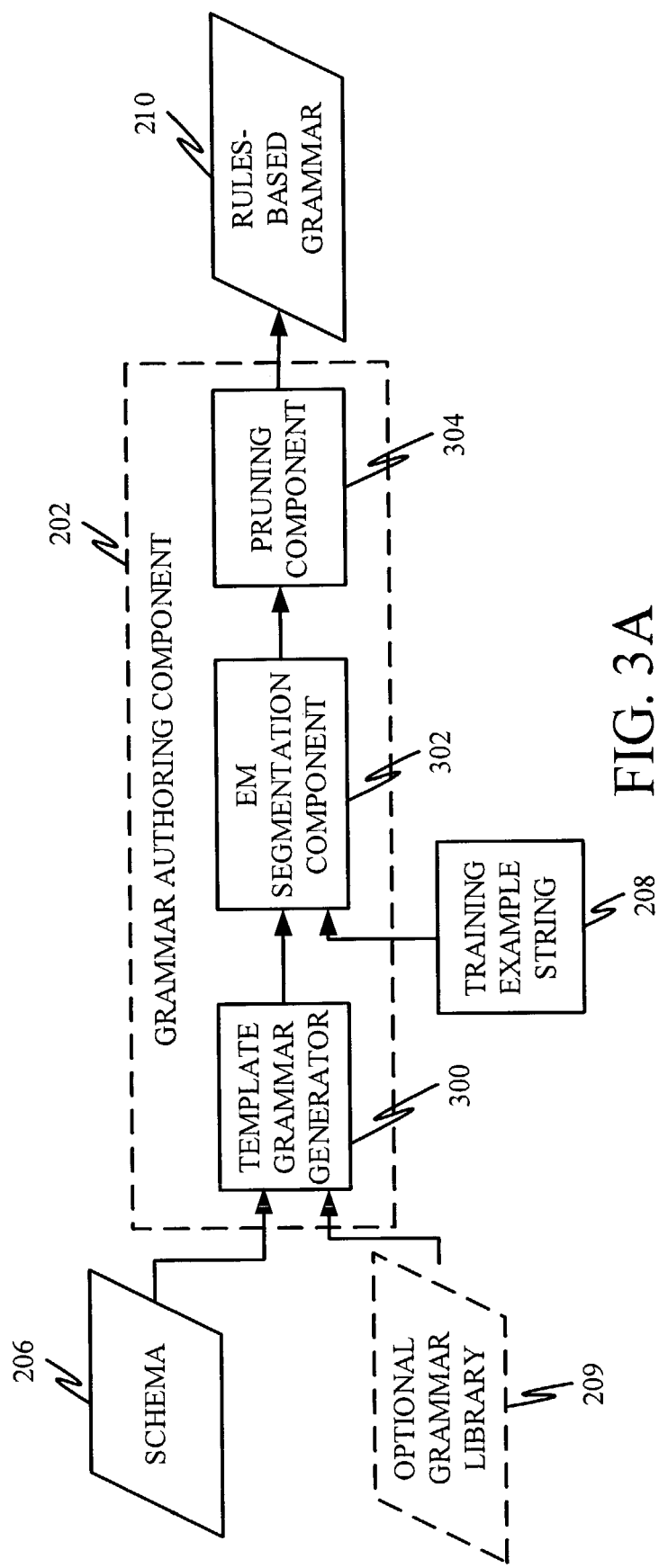
FIG. 3A is a block diagram showing a grammar authoring component in greater detail.

FIG. 3A shows a block diagram illustrating model authoring component 202 in greater detail. FIG. 3A shows that model authoring component 202 illustratively includes template grammar generator 300, segmentation EM application component 302 and pruning component 304. Template grammar generator 300 receives schema 206 and any rules in optional grammar library 209 referred to (through proper type unification) by semantic classes in schema 206 and generates a template grammar which includes all rules that can be learned or gleaned from schema 206 and optional grammar library 209. The template grammar is then taken by the EM segmentation EM component as an input, together with the training examples (text strings and their annotations.) The EM segmentation component 302 will use the template grammar to find the segmentation ambiguities in the training examples. Component 302 then operates to disambiguate any segmentation ambiguities. Based on that disambiguation, rewrite rules can be pruned from the grammar using pruning component 304 to provide the rules-based grammar 210.

To further illustrate the operation of EM segmentation component 302, FIGS. 2F and 2G provide exemplary tables. FIG. 2F shows a table that includes a set of examples. The first of which shows that the word "from" can possibly map to either the preterminal ShowFlightCmd or the perterminal FlightPreDepartureCity. The example may be harvested by component 302 from the example sentence "from Seattle to Boston". The second example indicates that the words "Flight from" can be mapped to preterminals "ShowFlightCmd and FlightPreDepatureCity. The example may be harvested by component 302 from the example sentence like "Flight from Seattle to Boston". The third example illustrates that the words "Flight to" can be mapped to the preterminals ShowFlightCmd and FlightPreArrivalCity, which can be similarly obtained by component 302 from example like "Flight to Boston on Tuesday". However, the segmentation of the examples is ambiguous. In other words, it is not yet known whether the word "from" in the first example is to be mapped to the preterminal ShowFlightCmd or to the preterminal FlightPreDepartureCity. Similarly, it is not known how the words "Flight from" are to be mapped between the preterminals ShowFlightCmd and FlightPreDepatureCity. Additionally, of course, it is not known how the words "Flight to" are to be mapped between the possible preterminals ShowFlightCmd and FlightPreArrivalCity.

Figure 3B:
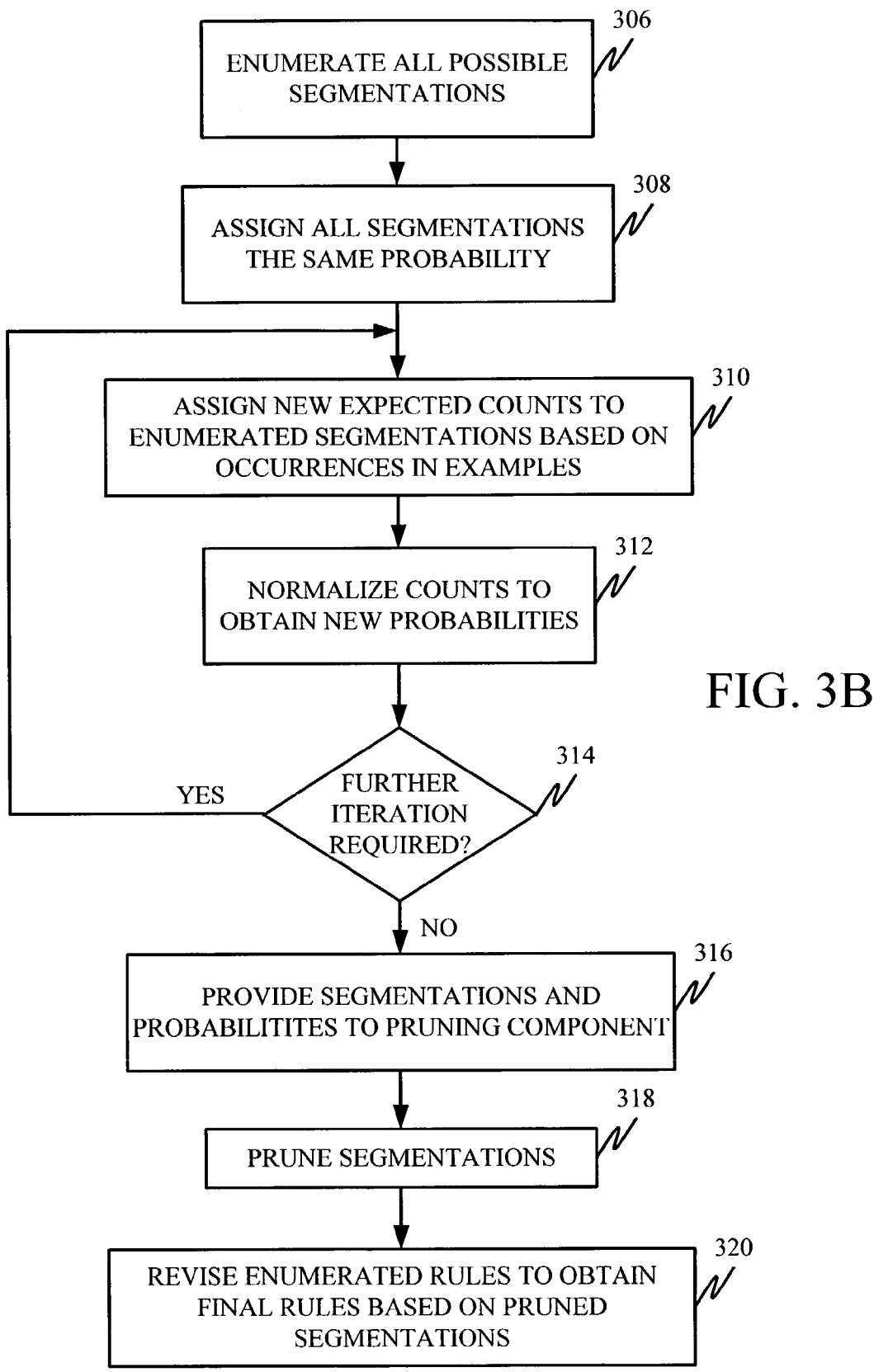
FIG. 3B is a flow diagram illustrating the operation of the grammar-authoring component shown in FIG. 3A.

FIG. 2G is a table further illustrating the operation of the EM algorithm application component 203. FIG. 3B is a flow diagram illustrating the operation of component 203 and will be described along with FIGS. 2F and 2G.

First, component 302 enumerates all possible segmentations. This is shown in the left column of FIG. 2G labeled possible re-write rules. In the re-write rules shown in FIG. 2G, some of the words that form the preterminal names are abbreviated. Therefore, by way of example, the re-write rule SFCmd→ε indicates the segmentation in which the ShowFlightCmd (abbreviated SFCmd) preterminal is mapped to an empty set. Similarly, the rewrite rules SFCmd→from represents the segmentation in which the word "from" is mapped to the preterminal ShowFlightCmd. Further, FPDCity→ε represents the segmentation in which the preterminal FlightPreDepartureCity (abbreviated FPDCity) is mapped to the empty set, and FPACity→ε represents the segmentation in which the preterminal FlightPreArrivalCity (abbreviated FPACity) is mapped to the empty set. From these examples, the other notation in the re-write rule portion of the table shown in FIG. 2G is self explanatory. Suffice it to say that each possible segmentation for the examples shown in FIG. 2F is enumerated.

From the first example in FIG. 2F, one segmentation indicates that the word "from" is mapped to ShowFlightCmd and another segmentation indicates that the word "from" is mapped to FlightPreDepartureCity.

The second example in FIG. 2F supports a number of different segmentation alternatives as well. For example, in accordance with one segmentation alternative, the words "Flight from" are both mapped to the perterminal ShowFlightCmd and the preterminal FlightPreDepartureCity is mapped to ε. In another segmentation alternative, the words "Flight from" are both mapped to the preterminal FlightPreDepatureCity and the preterminal "ShowFlightCmd" is mapped to ε. In yet another alternative, the words "Flight" and "from" are split such that the word "Flight" is mapped to the preterminal ShowFlightCmd and the word "from" is mapped to the preterminal FlightPreDepartureCity. Each of these segmentations is also shown in the rewrite rules enumerated in FIG. 2G.

The third example can be segmented in a similar way to the second example in that the words "Flight to" can be mapped to either the preterminal ShowFlightCmd or the preterminal FlightPreArrivalCity while the other preterminal is mapped to $\epsilon$, or the words "Flight to" can be split between the preterminals ShowFlightCmd and FlightPreArrivalCity. Again, each of these segmentations is represented in the rewrite rules shown in FIG. 2G.

Enumeration of all possible segmentations is indicated by block 306 in the flow diagram of FIG. 3B.

Once the rewrite rules that support the segmentations are enumerated, they are each assigned a probability. Initially, all segmentations illustrated in FIG. 2G are assigned the same probability. This is indicated by block 308 in FIG. 3B.

Next, component 302 assigns new expected counts to the enumerated rewrite rules, based upon the possible occurrences of those counts in the examples shown in FIG. 2F. This is indicated by block 310. For instance, from the first example, there are two possible segmentations, one which maps the word "from" to ShowFlightCmd and maps the preterminal FlightPreDepartureCity to $\epsilon$, and the other of which maps ShowFlightCmd to $\epsilon$ and maps the word "from" to the preterminal FlightPreDepartureCity. The first rewrite rule says that the ShowFlightCmd preterminal maps to $\epsilon$ (the empty set). Therefore, half of the segmentations in example 1 support the first rewrite rule shown in the table of FIG. 2G. Thus, from the first example, the first rewrite rule (ShowFlightCmd→$\epsilon$) is assigned a count of one half.

As discussed above, the second example supports three different segmentations, one of which assigns both words "Flight from" to the preterminal ShowFlightCmd and the preterminal FlightPreDepartureCity to $\epsilon$, another of which maps the word "Flight" to the preterminal ShowFlightCmd and the word "from" to the preterminal FlightPreDeparturecity, and the last of which maps the preterminal ShowFlightCmd to $\epsilon$ and both words "Flight from" to the preterminal FlightPreDepartureCity. Of those three segmentations, one supports the first rewrite rule (SFCmd→$\epsilon$). Therefore, from the second example, the first rewrite rule is assigned a count of one third.

In the same way, the third example has three possible segmentations, one of which maps the preterminal ShowFlightCmd to $\epsilon$. Therefore, from the third example, the first rewrite rule shown in FIG. 2G is again assigned a count of one third.

Using this type of analysis, it can be seen that the second rewrite rule (SFCmd→from) is only supported by the first example. Therefore, since there are two possible segmentations for the first example, and one of them supports the second rewrite rule, the second rewrite rule (SFCmd→from) is assigned a count of one half.

The third rewrite rule (SFCmd→Flight) is supported by one of the segmentations from each of the second and third examples shown in FIG. 2F. Therefore, since each of those examples has three possible segmentations, the third rewrite rule (SFCmd→Flight) is assigned a count of one third from each example.

Component 302 assigns counts to each of the enumerated rewrite rules in FIG. 2G in this way, and those counts are illustrated in the second column of the table shown in FIG. 2G. The counts are all converted such that they have a common denominator, and they are then normalized for each preterminal to get the probability. In other words, the total probability mass for the ShowFlightCmd terminal must add to one. Therefore, the counts for each rewrite rule are multiplied by a normalization factor in order to obtain a probability associated with that rewrite rule.

For example, it can be seen that the total number of counts for the preterminal ShowFlightCmd is 3. Therefore, the probability of the first rewrite rule (SFCmd→$\epsilon$) is $7/18$. Similarly, the probability for the second rewrite rule (SFCmd→from) is $3/18$, etc. Component 302 processes the counts for each rewrite rule, and each preterminal, in order to obtain this probability.

It can thus be seen that, for the preterminal FPDCity, the sum of the counts over all different rules is 2, therefore the normalization factor is $1/2$. For the final preterminal FPACity, there is only one count, and therefore the normalization factor is one. It can thus be seen that component 302 resets the probability associated with each rewrite rule to one which more accurately reflects the occurrences of the rewrite rule supported by the examples. Normalizing the counts to obtain the new probability is indicated by block 312 in FIG. 3B.

Component 302 iterates on this process (re-estimating the counts and obtaining new probabilities) until the counts and probabilities converge. This is indicated by block 314. For instance, in order to obtain a new count $\overline{C}$ for the first rewrite rule, component 302 implements equation 1 that first find the total likelihood of observing the word "from" given the non-terminal sequence ShowFlightCmd and FPDCity as follows:

$$P(\text{from}|\text{ShowFlight}Cmd\ FPD\text{City})=P(\epsilon|\text{ShowFlight-}Cmd)*P(\text{from}"FPD\text{City})+P(\text{from}|\text{ShowFlight}Cmd)*P(\epsilon|FPD\text{City})=[(7/18)\times(5/12)]+[(3/18)\times(5/12)]=50/216 \qquad \text{Eq. 1}$$

Out of this amount, the proportion for the segmentation that aligns the empty string to ShowFlightCmd and "from" to FPDCity becomes the new expected count $\overline{C}$:

$$\overline{C}(e\mid ShowFlightCmd) = \qquad \text{Eq. 2}$$

$$\frac{P(e\mid ShowFlightCmd) * P(from\mid FPDCity)}{P(from\mid ShowFlightCmd\ FPDCity)} = \frac{\frac{7}{18}\times\frac{5}{12}}{\frac{50}{216}} = \frac{\frac{35}{216}}{\frac{50}{216}} = \frac{35}{50} = \frac{7}{10}$$

Similarly, the new count $\overline{C}$ for the second rewrite rule (SFCmd→from) is computed as follows:

$$\overline{C}(from\mid cmd) = \frac{P(from\mid ShowFlightCmd) * P(e\mid FPDCity)}{P(from\mid ShowFlightCmd\ FDPCity)} = \qquad \text{Eq. 3}$$

$$\frac{\frac{3}{18}\times\frac{5}{12}}{\frac{50}{216}} = \frac{\frac{15}{216}}{\frac{50}{216}} = \frac{3}{10}$$

This process is continued for each of the rewrite rules to collect the counts $\overline{C}$ from each example. Then, the new counts are multiplied by the normalization factor to obtain the new probabilities. As shown in FIG. 3B, component 302 iterates on this process, re-estimating the new counts and the new probabilities until the probabilities converge.

Once the iteration is complete, component 302 will have computed a new count and new probability associated with each of the enumerated rewrite rules. While this, in and of itself, is very helpful, because it has assigned a probability to each of the segmentations to the rules corresponding to the different segmentations obtained during training, it may not be a desired final result. For example, some parsers are unable to take advantage of probabilities. Also, in some parsing components, a large number of rules render the parser less effective.

Thus, in accordance with one embodiment of the present invention, component 302 provides the rules and associated probabilities to pruning component 304 where the rules can be pruned. This is indicated by blocks 316 and 318 in FIG. 3B. Pruning component 304 can prune the rules (as indicated by block 320) in one of a number of different ways. For example, pruning component 304 can simply prune out rules that have a probability below a desired threshold level. Component 304 then introduces the remaining rules into the rules-based grammar 210.

In accordance with another embodiment, pruning component 304 eliminates all but a predetermined number of segmentations with high likelihood corresponding to each example, and only introduce rewrite rules to the grammar according to the remaining segmentations. For instances, component 304 may eliminate all the segmentations corresponding to each example but the one that has the highest probability. Thus, for example 1, assume that the segmentation that mapped the word "from" to the preterminal FlightPreDepartureCity had a higher probability than the segmentation which assigned the word "from" to the preterminal ShowFlightCmd. In that instance, the second segmentation (the one which mapped "from" to ShowFlight-Cmd) is eliminated. In that case, the two rewrite rules that support the chosen segmentation are added to the grammar. Therefore, the rewrite rule "SFCmd→ε" and the rewrite rule "FPDCity→from" are both added to the grammar.

Similarly, rules which are no longer supported by the best segmentation of any examples can be removed from the enumerated rules shown in FIG. 2G. Thus, the rule "SFCmd→from" can be removed, since it was only supported by the segmentation for example 1 that has been eliminated.

Application of the EM algorithm in this way is now described in more formal mathematical terms. Segmentation ambiguity resolution can be formalized as the problem of finding an m block partition $\pi=\alpha_1, \alpha_2, \ldots, \alpha_m$ for the word sequence $w=w_1, w_2, \ldots, w_n$, such that each block aligns to a pre-terminal in the sequence $N=NT_1, NT_2, \ldots, NT_m$. A block may contain 0 or more words from w.

If we model the joint probability of $\pi$, N and w with $$P(\pi, N, w) = \prod_{i=1}^{m} P(NT_i \to \alpha_i) \quad \text{Eq. 4}$$

Then given N and w, the most likely segmentation can be obtained as:

$$\hat{\pi} = \arg\max_\pi P(\pi, N, w) = \arg\max_{\pi=\alpha_1,\ldots,\alpha_m} \prod_{i=1}^{m} p(NT_i \to \alpha_i) \quad \text{Eq. 5}$$

Such a partition can be found with Viterbi search. Thus the only problem left is to estimate the model parameter $P(NT \to \alpha)$ for every pre-terminal (or concept) NT and word sequence $\alpha$. This could be done with maximum likelihood (ML) estimation if the training data is a list of pre-terminals paired with a word sequence for each pre-terminal. However, the training examples obtained form the user via the authoring tool are illustratively pairs of pre-terminal sequences and terminal sequences. The partition or segmentation is a hidden variable and unknown to the tool.

The EM algorithm initially sets the parameters $P_\phi$ for the model, and then iteratively modifies the parameters to $P_{\phi'}$, such that the likelihood of the observation D increases.

To find such $P_{\phi'}$, we define the auxiliary function Q in (6):

$$Q(P_{\phi'} \mid P_\phi) = \sum_{N,w} c(N, w) \sum_\pi P_\phi(\pi \mid N, w) \log \frac{P_{\phi'}(\pi, N, w)}{P_\phi(\pi, N, w)} \quad \text{Eq. 6}$$

It is a lower bound of $L(D|P_{\phi'})-L(D|P_\phi)$, the log-likelihood difference of the training data between the two model parameterizations. The EM algorithm resets the parameters $P_{\phi'}$ greedily by maximizing Q to maximize the increase of training sample likelihood by the new parameterization, subject to the constraints that the probabilities of all possible rewrite rules for a pre-terminal must sum to 1. Therefore, for each rule $NT \to \alpha$ its new probability can be obtained by solving the following equation:

$$\frac{\partial \left( Q(P_{\phi'} \mid P_\phi) + \lambda \left( \sum_\alpha P_{\phi'}(NT \to \alpha) - 1 \right) \right)}{\partial P_{\phi'}(NT \to \alpha)} = 0 \quad \text{Eq. 7}$$

Since $P_{\phi'}(\pi, N, w) = \prod_{NT,\alpha} P_{\phi'}(NT \to \alpha)^{c(NT \to \alpha;\pi,N,w)}$, $$\frac{\partial Q(P_{\phi'} \mid P_\phi)}{\partial P_{\phi'}(NT \to \alpha)} = \sum_{N,w} c(N, w) \sum_\pi \frac{P_\phi(\pi \mid N, w) c(NT \to \alpha; \pi, N, w)}{P_{\phi'}(NT \to \alpha)} \quad \text{Eq. 8}$$
$$= -\lambda.$$

Therefore, the probability should be reset to the expected count times the normalization factor $-1/\lambda$:

$$P_{\phi'}(NT \to \alpha) = \frac{-1}{\lambda} \sum_{N,w} c(N, w) \sum_s P_\phi(\pi \mid N, w) c(NT \to \alpha; \pi, N, w). \quad \text{Eq. 9}$$

To calculate the expected counts, note that $$\frac{\partial P_\phi(N, w)}{\partial P_\phi(NT \to \alpha)} = \frac{\partial \sum_\pi P_\phi(\pi, N, w)}{\partial P_\phi(NT \to \alpha)} = \quad \text{Eq. 10}$$

$$\sum_\pi \frac{c(NT \to \alpha; \pi, N, w) \prod_{NT,\alpha} P_\phi(NT \to \alpha)^{c(NT \to \alpha;\pi,N,w)}}{P_\phi(NT \to \alpha)} =$$

$$\sum_\pi \frac{P_\phi(\pi, N, w) c(NT \to \alpha; \pi, N, w)}{P_\phi(NT \to \alpha)} =$$

$$P_\phi(N, w) \frac{\sum_\pi P_\phi(\pi \mid N, w) c(NT \to \alpha; \pi, N, w)}{P_\phi(NT \to \alpha)}.$$

hence $$\sum_{\pi} P_\phi(\pi \mid N, w) c(NT \to \alpha; \pi, N, w) = \frac{P_\phi(NT \to \alpha)}{P_\phi(N, w)} \frac{\partial P_\phi(N, w)}{\partial P_\phi(NT \to \alpha)}. \quad \text{Eq. 11}$$

Let $E_{ij}^k = (N \Rightarrow w_1, \ldots, w_{i-1}, NT^k, w_{j+1}, \ldots, w_n)$ be the event that in the process of rewriting the pre-terminal sequence N to the word sequence w, the rule $NT \to \alpha$ is used for the kth pre-terminal in N to generate the sub-sequence $\alpha = w_i, \ldots, w_j$, and let $\lambda_s^1(p,q)$ be the probability that the pre-terminals from position s to t in the sequence N cover the terminal words $w_p, \ldots, w_{q-1}$. Then $$P_\phi(N, w) = \quad \text{Eq. 12}$$
$$\sum_{ij} E_{ij}^k = \sum_{ij} \lambda_1^{k-1}(1, i) \lambda_{k+1}^m (j+1, n+1) P_\phi(NT \to w_i, \ldots, w_j)$$

$$\frac{\partial P_\phi(N, w)}{\partial P_\phi(NT_k \to \alpha)} = \sum_{ij: \alpha = w_i, \ldots, w_j} \lambda_1^{k-1}(1, i) \lambda_{k+1}^m (j+1, n+1) \quad \text{Eq. 13}$$

Therefore if we can compute $\lambda_s^1(p,q)$, we can be combine equations (9), (11) and (13) to obtain the expected counts and reset the model parameters. In fact $\lambda_s^1(p,q)$ can be computed with dynamic programming according to (14), where $\epsilon$ is the null string:

$$\lambda_s^t(p, q) = \sum_{p \leq r \leq q} \lambda_s^{t-1}(p, r) \lambda_t^t(r, q); \quad \text{Eq. 14}$$

$$\lambda_s^s(p, q) = \begin{cases} P_\phi(NT_s \to w_p, \ldots, w_{q-1}) & \text{if } p < q \\ P_\phi(NT_s \to \varepsilon) & \text{if } p = q \end{cases};$$

Note that $P_\phi(N, w) = \lambda_1^m(1, n+1)$ can be used in equation (11).

Thus, one aspect of the present invention applies the EM algorithm to disambiguate segmentation ambiguities. This can fully automate the grammar authoring process thus reducing necessity for developer intervention. It also performs consistent disambiguation and can automatically perform the disambiguation even when there are a large number of preterminals and words that are unassigned after template grammar generation.

Although the present invention has been described with reference to particular embodiments, workers skilled in the art will recognize that changes may be made in form and detail without departing from the spirit and scope of the invention.

What is claimed is:

1. A method of generating a rules-based grammar for natural language processing:
   identifying segmentation ambiguities in training data in which segmentation of the training data is ambiguous;
   enumerating rewrite rules for all ambiguous segmentations; and
   automatically resolving the segmentation ambiguities by generating a probability for each enumerated rewrite rule based on occurrences of the rewrite rule supported by the training data.

2. The method of claim 1 wherein automatically resolving the segmentation ambiguities comprises:
   estimating counts for each enumerated rewrite rule based on occurrences of the enumerated rewrite rules supported by the training data;
   generating a probability for the each enumerated rewrite rule based on the counts estimated;
   re-estimating the counts for the enumerated rewrite rules based on the probability for each rewrite rule obtained; and
   iterating on the steps of obtaining a probability and re-estimating the counts until a desired convergence is obtained.

3. The method of claim 2 and further comprising:
   receiving the training data.

4. The method of claim 3 wherein receiving the training data comprises:
   receiving a schema and one or more semantically annotated text strings.

5. The method of claim 4 wherein identifying segmentation ambiguities comprises:
   generating a template grammar from the training data, the template grammar including rewrite rules.

6. The method of claim 5 wherein identifying segmentation ambiguities comprises:
   generating a parse tree from the schema, the rewrite rules and the annotated text strings.

7. The method of claim 6 wherein each rewrite rule maps a leaf in the parse tree to a portion of the text string and wherein identifying segmentation ambiguities comprises:
   identifying an ambiguous portion of the text string that can be mapped to more than one possible leaf in the parse tree.

8. The method of claim 7 wherein enumerating rewrite rules for all ambiguous segmentations comprises:
   enumerating a rewrite rule that maps the ambiguous portion of the text string to each of the possible leaves in the parse tree.

9. The method of claim 8 wherein generating a probability for each enumerated rewrite rule comprises:
   normalizing the counts for each rewrite rule that applies to a same leaf.

10. The method of claim 2 and further comprising:
    prior to estimating counts, setting probabilities for each possible segmentation of a segmentation ambiguity example to a same value.

11. The method of claim 2 wherein automatically resolving the segmentation ambiguities comprises:
    pruning the enumerated rewrite rules based on the probabilities generated.

12. The method of claim 11 wherein pruning comprises:
    determining whether the probability generated for each rewrite rule meets a threshold value; and
    pruning the rewrite rules based on the determination.

13. The method of claim 12 wherein pruning comprises:
    pruning rewrite rules that fail to meet the threshold.

14. The method of claim 11 wherein pruning comprises:
    pruning a rewrite rule that has not been supported by most likely segmentations for all training examples of a segmentation ambiguity.

15. A computer implemented grammar authoring system for authoring a rules-based grammar, comprising:
    a template grammar generator configured to receive training data and generate a template grammar including ambiguous rewrite rules corresponding to segmentation ambiguities in the training data;
    a disambiguation component, coupled to the template grammar generator, receiving the ambiguous rewrite rules and configured to generate probabilities for the ambiguous rewrite rules; and a pruning component, coupled to the disambiguation component, configured to prune the ambiguous rewrite rules based on the probabilities generated.

16. The grammar authoring system of claim 15 wherein the ambiguous rewrite rules each correspond to a possible segmentation in a set of ambiguous segmentations.

17. The grammar authoring system of claim 16 wherein the disambiguation component comprises:

an estimation maximization (EM) algorithm application component configured to apply the EM algorithm to generate a probability associated with each possible segmentation.

18. The grammar authoring system of claim 17 wherein the EM algorithm application component is configured to:

estimate counts for each enumerated rewrite rule based on occurrences of the enumerated rewrite rules supported by the training data;

generate a probability for the each enumerated rewrite rule based on the counts estimated;

re-estimate the counts for the enumerated rewrite rules based on the probability for each rewrite rule obtained; and iterate on the steps of obtaining a probability and re-estimating the counts until a desired convergence is obtained.

19. The grammar authoring system of claim 18 wherein training data comprises:

a schema and one or more semantically annotated text strings.

20. The grammar authoring system of claim 19 wherein the template grammar generator is configured to generate a parse tree from the schema, the rewrite rules and the annotated text strings.

21. The grammar authoring system of claim 20 wherein each rewrite rule maps a leaf in the parse tree to a portion of the text string and wherein the template grammar generator is configured to identify an ambiguous portion of the text string that can be mapped to more than one possible leaf in the parse tree.

22. The grammar authoring system of claim 21 wherein the template grammar generator is configured to enumerate a rewrite rule that maps the ambiguous portion of the text string to each of the possible leaves in the parse tree.

23. The grammar authoring system of claim 15 wherein the pruning component is configured to determine whether the probability generated for each rewrite rule meets a threshold value; and prune the rewrite rules based on the determination.

24. The grammar authoring system of claim 23 wherein the pruning component is configured to prune the rewrite rules by pruning rewrite rules that fail to meet the threshold.

25. The grammar authoring system of claim 15 wherein the pruning component is configured to prune a rewrite rule that has not been supported by most likely segmentations for all training examples of a segmentation ambiguity.

* * * * *